US008706082B2

(12) United States Patent
Novack et al.

(10) Patent No.: US 8,706,082 B2
(45) Date of Patent: Apr. 22, 2014

(54) MEDIA SERVICES WITH ACCESS CONTROL

(75) Inventors: Brian M Novack, St. Louis, MO (US); David Dunmire, Rosewell, GA (US); Jason Hicks, Edwardsville, IL (US); Matthew A Rakers, Aviston, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 564 days.

(21) Appl. No.: 11/190,310

(22) Filed: Jul. 26, 2005

(65) Prior Publication Data

US 2007/0028091 A1 Feb. 1, 2007

(51) Int. Cl.
*H04M 1/66* (2006.01)
*H04M 1/68* (2006.01)
*H04M 3/16* (2006.01)

(52) U.S. Cl.
USPC ........................................................ 455/411

(58) Field of Classification Search
USPC .................................. 455/411, 436; 713/163
See application file for complete search history.

(56) References Cited

U.S. PATENT DOCUMENTS

| | | | |
|---|---|---|---|
| 3,990,012 A | | 11/1976 | Karnes |
| 5,771,282 A | * | 6/1998 | Friedes .................... 379/121.03 |
| 6,021,189 A | * | 2/2000 | Vu ............................ 379/114.17 |
| 6,104,922 A | * | 8/2000 | Baumann ...................... 455/410 |
| 6,115,821 A | | 9/2000 | Newby |
| 6,233,736 B1 | | 5/2001 | Wolzien |
| 6,335,927 B1 | | 1/2002 | Elliott et al. |
| 6,640,304 B2 | | 10/2003 | Ginter et al. |
| 6,792,323 B2 | | 9/2004 | Krzyzanowski et al. |
| 7,257,132 B1 | * | 8/2007 | Akamatsu et al. ............ 370/486 |
| 2002/0056142 A1 | | 5/2002 | Redmond |
| 2002/0064149 A1 | | 5/2002 | Elliott et al. |
| 2002/0111154 A1 | * | 8/2002 | Eldering et al. .............. 455/414 |
| 2002/0144289 A1 | | 10/2002 | Taguchi et al. |
| 2002/0161633 A1 | * | 10/2002 | Jacob et al. ..................... 705/14 |
| 2003/0092452 A1 | * | 5/2003 | Youngs et al. ................ 455/461 |
| 2003/0097655 A1 | * | 5/2003 | Novak ............................ 725/31 |
| 2003/0190908 A1 | * | 10/2003 | Craven ......................... 455/411 |
| 2004/0123129 A1 | | 6/2004 | Ginter et al. |
| 2004/0203630 A1 | * | 10/2004 | Wang ......................... 455/414.1 |
| 2005/0114711 A1 | | 5/2005 | Hesselink et al. |
| 2006/0259927 A1 | * | 11/2006 | Acharya et al. ................ 725/61 |

FOREIGN PATENT DOCUMENTS

| | | |
|---|---|---|
| CA | 2160278 | 6/1996 |
| WO | WO-0133729 | 5/2001 |
| WO | WO-0133808 | 5/2001 |

OTHER PUBLICATIONS

"Wi-Fi Security at Work and on the Road", www.wi-fi.org/OpenSection/secure.asp?TID=2, (Accessed Jun. 9, 2005), 7 pgs.
The Global Information Assurance, "SPYRUS Media Contact", http://www.spyrus.com/company/technology.html, Accessed Jun. 9, 2005, 8 pgs.

* cited by examiner

*Primary Examiner* — Kwasi Karikari

(74) *Attorney, Agent, or Firm* — Guntin & Gust, PLC; Andrew Gust

(57) ABSTRACT

Systems and methods are describe wherein a service provider provides media services that can include, but are not limited to, telephone, radio, interactive and television services. A user residence and/or a user receiving device are designated as a primary location or device for receiving the services of the service provider. An authorization center authenticates a request to provide the service(s) at one or more secondary location/device. The verification process can include, but is not limited to, password(s), Personal Identification Numbers (PIN) and biometric identifiers such as voice, retina, finger print and DNA.

24 Claims, 3 Drawing Sheets

MEDIA SERVICES WITH ACCESS CONTROL

FIELD OF THE INVENTION

This disclosure relates to providing services and, more particularly, the portability of media services.

BACKGROUND OF THE INVENTION

Service providing companies such a television, radio, interactive media, Internet access and telephone companies typically contract with customers for services. The contracts can include basic services and optional enhancements.

Television services, such as cable and satellite, are associated with either a physical address and/or receiver device located at the physical address. For example, television service plans are semi-custom to allow a receiver device (set-top box) to access media content. Cable and satellite services can allow customers to select service plans that include basic service and enhanced services such as access to movie channels. Further, customer specific settings or profiles such as parental controls to prevent children from accessing undesired media content can be specified for the customer receiver device.

In addition to satellite television services, satellite radio services are also available. Similar to the satellite television and cellular telephone services, the satellite radio service allows a specific receiving device to access audio content. A customer can select a service plan that allows access to a selection of satellite radio stations.

Services and media delivery services are currently often associated with a customer and the customer's physical address or device. For example, service plans, such as long distance telephone rates, for wired telephone services are provided to a physical address. Similarly, cellular telephone services and plans are associated with specific phone devices. Calling cards are available which allow the user to charge telephone usage against a pre-paid, debit or credit account. The fees associated with the calling card are often excessive compared to contracted accounts for other telephone services. For example, a residential telephone service agreement may provide unlimited long distance calling at specified times. Further, cellular telephone service agreements often provide free incoming and outgoing calls up to a specified periodic limit.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

In the following descriptions, for purposes of explanation, numerous specific details are set forth in order to provide a thorough understanding of the various embodiments. It will be evident, however, to one skilled in the art that embodiments of the invention may be practiced without making use of many of these specific details.

Figure 1:
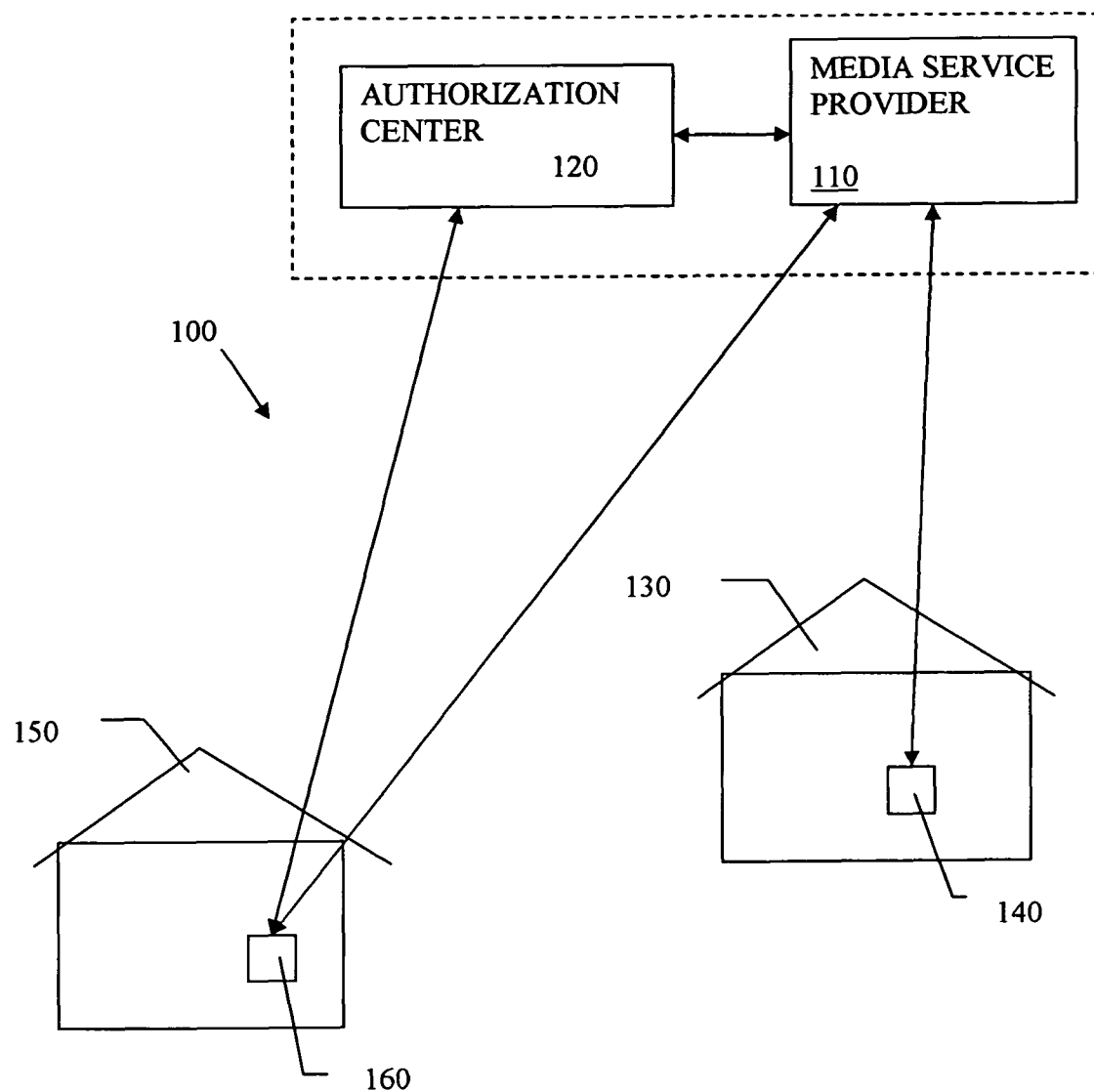
FIG. 1 illustrates service systems according to embodiments of the present invention.

A substantial limitation of the prior art service systems, as described above, is the association to a specific location or device. Embodiments of the present invention provide portability of services. Referring to FIG. 1, a service system 100 of an embodiment of the invention is described. The system includes a service provider 110. The service provider can include, but is not limited to, telephone, radio, interactive (including shopping and gaming), Internet access and television service providers, generally referred to herein as either service providers, or media service providers. A user residence 130 and/or a user receiving device 140 is designated as a primary location or device for receiving the services of the service provider. A secondary location 150 and/or secondary receiver 160 allows the user to receive the services of the service provider 110.

An authorization center 120 is provided to authenticate a request to provide the contracted services at the secondary location/device. In one embodiment the authorization center is a component of the service provider, as illustrated by the dashed line in FIG. 1. In another embodiment, the authorization center is separate from the service provider. The authorization center 120 verifies the identity of the user using a verification process. The verification process can include, but is not limited to, password(s), Personal Identification Numbers (PIN) and biometric identifiers such as voice, retina, finger print and DNA of the user.

Figure 2:
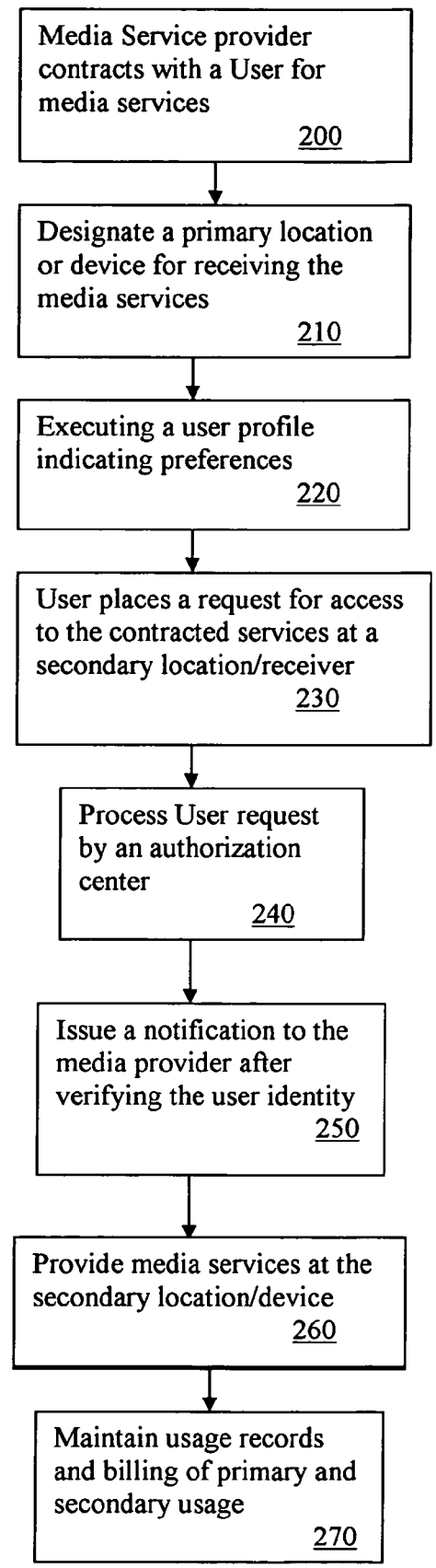
FIG. 2 is flow chart illustrating methods according to embodiments of the present invention.

One example method embodiment of the present invention is described with reference to the flowchart of FIG. 2. A media service provider such as a satellite television provider contracts with a user for services, at 200. The services can include access to specified media content, such as movie channels. The user can designate a primary location or device for receiving the services, at 210. Further, the contracted services can optionally include executing a user profile indicating preferences, at 220.

In this example, a primary satellite receiver can be designated at the user's residence. When the user is at a secondary location capable of receiving the services, the user places a request for access to the contracted services, at 230. For example, the user may be visiting a relative at a secondary location where the relative has a satellite television service, but has not contracted for access to the media content accessible via the user's contracted service.

At step 240, the user's request is processed by the authorization center to verify the identity of the user. If the authorization center is separate from the media service provider, a notification is issued by the authentication center to the media provider after verifying the user identity at 250. Based upon a positive identification, at step 260, the contracted services are provided at the secondary location/device.

In exchange for the services, the user typically pays a monetary fee. The fees can be paid using any compensation process, such as an invoice to a physical location, debit, credit or a direct transfer transaction. The invention is not limited to any specific fee payment systems. At step 270, service usage records and billing are maintained for the user, regardless of a location of the service usage.

In one embodiment, the services are provided at the requested secondary location while the service usage charges (if any) are maintained as if the services were used at the primary location. For example, the user may order a pay-per-view video via a satellite television media service. The video is viewed at the secondary location while the fee for the service is processed along with any other fees incurred by the user via the normal fee payment arrangement.

Embodiments of the invention can restrict access to contracted services to a single location or receiver at one time. That is, transferring the service to a secondary location prohibits access to the services at the primary location. In another embodiment, the primary location remains active while an additional service fee may be required to activate the secondary location. This embodiment can be used to authorize service to one or more secondary locations. For example, a parent can authorize services to a child location, such as a college dormitory. Further, the secondary location can be automatically terminated. For example, subsequently assessing the services at the primary location can terminate access at the secondary location. Alternately, a time limitation may trigger termination of the transferred service access.

In one embodiment, the user's profile is applied to the transferred service location. That is, the secondary location is treated as the primary location for purposes of profile preferences. For example, parental controls established for a child, language preferences and text captioning are applied to the services provided at the secondary location.

Again, the services are not limited to video services. The service provider can provide telephone communication services. The user can request that their contracted communication services be applied to a secondary telephone or device. As such, the user can apply contracted communication rates to any capable device.

In yet another embodiment, advertising content can be targeted to the identified user. That is, once the user's location is identified more personalized advertising can be provided. For example, a television service provider can provide advertising to the secondary location based upon the verification that the user is accessing the service. In addition to basic advertising, targeted advertising based upon the user's past preferences and the current location of the user can provide advertising for 'local' businesses near the user's current location.

Figure 3:
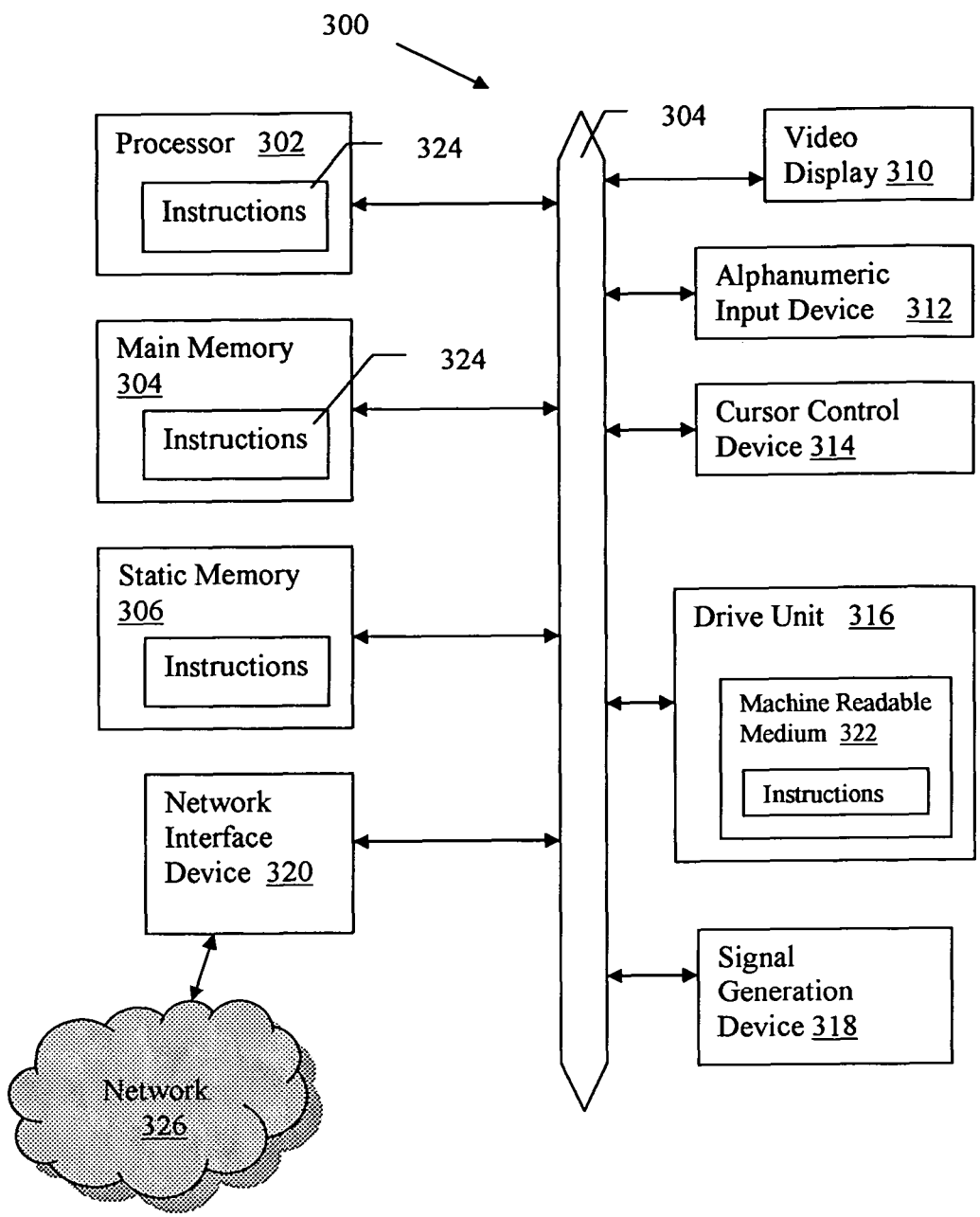
FIG. 3 is a diagrammatic representation of a machine in the form of a computer system according to embodiments of the present invention.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (nonvolatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A server comprising:
a memory to store computer instructions; and
a controller coupled with the memory, wherein the controller, responsive to executing the computer instructions, performs operations comprising:
receiving over a network a service request generated at a secondary location that includes a secondary media receiver and a secondary telephone device, wherein the secondary location is remote from the controller;
verifying an identity associated with the service request based on a subscription plan for communication services provided to a primary media receiver and to a primary telephone device at a primary location that is remote from the secondary location, wherein the secondary location is not designated under the subscription plan to access the communication services, and wherein the subscription plan for the communication services provided to the primary location comprises access to an internet access service and access to a telephone service; and
providing over the network a verification of the identity to a service provider system after the identity has been verified,
wherein the service provider system enables access to the internet access service and the telephone service via the secondary media receiver and the secondary telephone device based upon the verification of the identity from the controller without providing video services at the secondary location,
wherein the service provider system applies to the secondary media receiver a profile preference associated with the primary media receiver,
wherein the secondary media receiver presents the internet access service according to the profile preference,
wherein the service provider system generates a service usage record based upon the communication services enabled at the secondary location for the secondary media receiver and the secondary telephone device and associates the service usage record of the secondary location for the secondary media receiver and the secondary telephone device with a service usage record of the primary location,
wherein the telephone service enables contracted rates for the primary telephone device to be applied to voice calls made via the secondary telephone device, and
wherein subsequent access to the communication services at the primary media receiver causes the service provider system to terminate access to the internet access service at the secondary media receiver.

2. The server of claim 1 wherein the communication services comprise television and radio services, wherein the profile preference includes a language preference and a text captioning preference, and wherein the communication services are restricted to access by a single device at a time.

3. The server of claim 1 wherein operations of the controller are managed by a first entity that is different from a second entity that manages operations of the service provider system, and wherein access to the communication services at both the primary and secondary locations at the same time invokes an additional service fee.

4. The server of claim 1 wherein the controller, responsive to executing the computer instructions, performs the operations further comprising verifying the identity of a user requesting the communication services based upon biometric parameters of the user.

5. The server of claim 1 wherein the controller, responsive to executing the computer instructions, performs the operations further comprising verifying the identity of a user requesting the communication services based upon a personal identification number of the user.

6. The server of claim 1 wherein the controller, responsive to executing the computer instructions, performs the operations further comprising providing targeted advertising to replace broadcast advertising presented by the secondary media receiver based on the secondary location, wherein the targeted advertising is selected from among a group of advertising based on vendors being within a targeted distance of the secondary location.

7. A media service system comprising:
   a media server that provides media services to a primary media receiver and a primary telephone device of a user, wherein the primary media receiver and the primary telephone device are associated with a primary location for receiving the media services, wherein the media services comprise a telephone service and an internet access service; and
   an authentication center that processes a service request initiated by the user at a secondary location via a secondary media receiver and to verify an identity of the user, the verification being based on the service request and identification information supplied to the authentication center over a network from the secondary media receiver,
   wherein the media server enables access to the media services including the telephone service and the internet access service at the secondary media receiver and at a secondary telephone device based upon a verified identity of the user without providing video services at the secondary location.

8. The media service system of claim 7, wherein the media services comprise a television service, a radio service, an interactive shopping service, and an interactive gaming service, and wherein the media server applies to the secondary media receiver a profile preference associated with the primary location, wherein the secondary media receiver presents the media services according to the profile preference, and wherein the media server provides targeted advertising to the secondary media receiver that is selected based on the profile preference and the secondary location.

9. The media service system of claim 7 wherein the authentication center verifies the identity of the user requesting services according to a personal identification number of the user.

10. A method comprising:
    providing media services to a primary media receiver at a first location according to a subscription plan for the primary media receiver and for a primary telephone device, wherein the media services comprise an internet access service and a telephone service;
    receiving a request for the media services from a secondary media receiver at a second location that is associated with a secondary telephone device, wherein the first and second locations are remote from each other, and wherein the request is received over a network at an authentication center that is remote from the second location;
    authenticating the request at the authentication center based on the media services requested and identification information of a user supplied with the request;
    enabling access to the media services including the internet access service and the telephone service at the secondary media receiver and at the secondary telephone device without providing video services at the second location, wherein the media services at the second location are subject to parental control filters applied at the secondary media receiver based on a user profile associated with the primary media receiver, wherein the second location is not designated under the subscription plan to access the media services; and
    terminating access to the media services at the secondary media receiver responsive to detecting access to the media services at the primary media receiver.

11. The method of claim 10 wherein the media services comprise a television service, a radio service, an interactive shopping service and an interactive gaming service.

12. The method of claim 10 wherein the identification information comprises biometric parameters of the user and a personal identification number of the user.

13. The method of claim 10 comprising managing the media services according to service preferences of the user of the primary media receiver.

14. The method of claim 10 comprising combining records of service usage of the primary and secondary media receivers and the primary and secondary telephone devices.

15. The method of claim 10 wherein the media services presented at the secondary media receiver comprise advertising media content.

16. The method of claim 15 wherein the advertising media content comprises advertising content based upon the second location of the secondary media receiver, wherein the advertising content is associated with vendors within a target distance of the second location.

17. A method comprising:
    providing communication services including internet access service and telephone service to a primary media receiver and a primary telephone device of a user at a first location, wherein the communication services are provided to the primary media receiver and the primary telephone device according to a subscription plan for the first location;
    receiving a request with identification information associated with the user to provide the communication services to a group of secondary locations remotely located from the first location, wherein the group of secondary locations includes secondary media receivers and secondary telephone devices, wherein the request is received at a remote server over a network, wherein the group of secondary locations are not designated under the subscription plan;

verifying that the request is authorized by the user based on the identification information;
providing the communication services including the internet access service; and the telephone service to the secondary media receivers and to the secondary telephone devices responsive to the verification without providing video services at the group of secondary locations; and
selectively terminating the communication services at each of the group of secondary locations based on pre-determined time expiration periods for each of the group of secondary locations.

18. The method of claim 17, comprising:
maintaining a combined record of usage of the communication services at both the first location and the group of secondary locations; and
terminating access to the communication services at one of the secondary media receivers responsive to detecting access to the communication services at the primary media receiver, wherein the request and the identification information are received from the one of the secondary media receivers over the network, wherein the video media service comprises an interactive shopping service and an interactive gaming service.

19. The method of claim 17, further comprising:
applying user preferences that control a presentation of the communication services at the primary media receiver to the control of presentation of the communication services at the secondary media receivers; and
providing targeted advertising at the secondary media receivers in conjunction with the communication services, wherein the targeted advertising is selected based on the user preferences and includes vendors selected based on a proximity to the secondary locations.

20. A method comprising:
providing communication services including internet access, telephone and audio media services to a primary media receiver and a primary telephone device at a primary location via a media server, wherein the audio media services include access to a predefined category of audio media, wherein the communication services are provided to the primary media receiver and the primary telephone device according to a subscription plan for the primary media receiver and the primary telephone device;
receiving a request for the communication services to be provided to a secondary location that includes a secondary media receiver and a secondary telephone device and receiving user identification information, wherein the request and the user identification information are received over a network at an authentication center that is remote from the secondary location, wherein the request is without designation of particular devices at the secondary location to access the communication services, and wherein the secondary location is not designated under the subscription plan;
verifying at the authentication center that the request is authorized based on the request for communication services and the user identification information;
receiving a verified request at the media server from the authentication center; and
providing the communication services including the internet access, telephone and audio media services to the secondary media receiver and the secondary telephone device without providing video services at the secondary location, wherein service usage and profile preferences associated with the primary location are applied to the secondary location, the secondary media receiver and the secondary telephone device when the media server allows access to the communication services via the secondary media receiver and the secondary telephone device;
wherein subsequent access to the communication services at the primary media receiver terminates access to the communication services at the secondary media receiver,
wherein billing for the communication services is independent of devices utilizing the communication services.

21. An article including a machine-accessible storage device having associated information, wherein the information, when accessed, results in a machine performing operations comprising:
receiving a request to have media services designated for a primary media receiver and a primary telephone device to be provided to a secondary media receiver and a secondary telephone device, wherein the media services designated for the primary media receiver and the primary telephone device include internet access service and telephone service, wherein an identity associated with the primary media receiver and the primary telephone device is received in conjunction with the request, wherein the request is received over a network at an authentication center that is remote from the primary media receiver and the secondary media receiver;
verifying at the authentication center the identity received with the request; and
authorizing the media services including the internet access service and the telephone service to be provided to the secondary media receiver and the secondary telephone device by communicating the identity to a provider system of the media services without providing video services at a location of the secondary media receiver and a secondary telephone device.

22. The article of claim 21 wherein the media services comprise a television service, a radio service, an interactive shopping service, and an interactive gaming service, and wherein subsequent access to the media services at the primary media receiver terminates access to the media services at the secondary media receiver.

23. The article of claim 21 wherein verifying the identity is based on biometric parameters.

24. The article of claim 21 wherein the information, when accessed, results in the machine combining a record of service usage at the primary and secondary media receivers and telephone devices.

* * * * *